US012568106B1

(12) United States Patent
Horbatiuk et al.

(10) Patent No.: US 12,568,106 B1
(45) Date of Patent: Mar. 3, 2026

(54) VULNERABILITY RESULT INTEGRATION SCHEME

(71) Applicant: Rapid7, Inc., Boston, MA (US)

(72) Inventors: Ian Horbatiuk, Toronto (CA); Paul Miseiko, Mississauga (CA)

(73) Assignee: Rapid7, Inc., Boston, MA (US)

( * ) Notice: Subject to any disclaimer, the term of this patent is extended or adjusted under 35 U.S.C. 154(b) by 269 days.

(21) Appl. No.: 17/734,684

(22) Filed: May 2, 2022

Related U.S. Application Data

(63) Continuation-in-part of application No. 17/706,828, filed on Mar. 29, 2022.

(51) Int. Cl.
H04L 9/40 (2022.01)

(52) U.S. Cl.
CPC ...... H04L 63/1433 (2013.01); H04L 63/1416 (2013.01); H04L 63/145 (2013.01); H04L 63/20 (2013.01)

(58) Field of Classification Search
CPC . H04L 63/20; H04L 63/1416; H04L 63/1433; H04L 63/145; H04L 63/1425; G06F 21/577; G06F 21/552
See application file for complete search history.

(56) References Cited

U.S. PATENT DOCUMENTS

| | | | | |
|---|---|---|---|---|
| 9,246,934 B2 * | 1/2016 | Sabin | .................. | H04L 63/1433 |
| 2003/0204632 A1 * | 10/2003 | Willebeek-Lemair | ...................... | |
| | | | | H04L 63/1433 |
| | | | | 709/249 |

| | | | | |
|---|---|---|---|---|
| 2005/0154733 A1 * | 7/2005 | Meltzer | ............... | H04L 63/1416 |
| 2006/0020814 A1 * | 1/2006 | Lieblich | ............... | G06F 21/577 |
| | | | | 713/182 |
| 2008/0040790 A1 * | 2/2008 | Kuo | ...................... | G06F 21/604 |
| | | | | 726/22 |
| 2008/0092237 A1 * | 4/2008 | Yoon | ..................... | G06F 21/577 |
| | | | | 726/25 |
| 2008/0235801 A1 * | 9/2008 | Soderberg | ............. | G06F 21/563 |
| | | | | 726/25 |

(Continued)

FOREIGN PATENT DOCUMENTS

| | | | | |
|---|---|---|---|---|
| CN | 111914259 A | * | 11/2020 | |
| CN | 112511512 A | * | 3/2021 | |

(Continued)

OTHER PUBLICATIONS

Zhai, Y., Ning, P., Iyer, P., Reeves, D. "Reasoning about Complementary Intrusion Evidence", 20th Annual Computer Security Applications Conference, 2004. (Year: 2004).*

(Continued)

*Primary Examiner* — David Le
(74) *Attorney, Agent, or Firm* — Ashwin Anand

(57) ABSTRACT

Various embodiments include systems and methods to implement a complementary scan engine scheme for avoiding redundant vulnerability check data collection when using a scan engine to scan a target asset and/or to implement a vulnerability result integration scheme for determining whether to integrate a respective vulnerability result into one or more databases. In various embodiments, at least one integration state may be determined. According to the vulnerability result integration scheme, the at least one integration state may define whether an integrator is to integrate the respective vulnerability result into the database(s).

20 Claims, 10 Drawing Sheets

(56) References Cited

U.S. PATENT DOCUMENTS

| | | | | |
|---|---|---|---|---|
| 2009/0199298 A1* | 8/2009 | Miliefsky | ............... | H04L 63/20 |
| | | | | 709/217 |
| 2009/0235359 A1* | 9/2009 | Abdulhayoglu | .... | H04L 63/1433 |
| | | | | 726/25 |
| 2010/0017597 A1* | 1/2010 | Chandwani | ........ | H04L 63/0823 |
| | | | | 713/155 |
| 2010/0107257 A1* | 4/2010 | Ollmann | ............... | G06F 21/566 |
| | | | | 707/E17.014 |
| 2012/0102570 A1* | 4/2012 | Herz | ................... | G06Q 20/201 |
| | | | | 726/25 |
| 2013/0167238 A1* | 6/2013 | Russell | .............. | H04L 63/1433 |
| | | | | 726/25 |
| 2013/0268652 A1* | 10/2013 | Hugard, IV | ............ | H04W 4/38 |
| | | | | 709/224 |
| 2013/0269028 A1* | 10/2013 | Nakawatase | ........ | H04L 63/1433 |
| | | | | 726/22 |
| 2013/0269029 A1* | 10/2013 | Nakawatase | ........... | H04L 63/16 |
| | | | | 726/22 |
| 2014/0208425 A1* | 7/2014 | Palomaki | .............. | G06F 21/565 |
| | | | | 726/23 |

| | | | | |
|---|---|---|---|---|
| 2017/0098087 A1* | 4/2017 | Li | ....................... | H04L 63/1416 |
| 2017/0270304 A1* | 9/2017 | Li | ....................... | H04L 63/1416 |
| 2020/0259866 A1* | 8/2020 | Crabtree | ............ | G06F 16/2477 |
| 2021/0157927 A1* | 5/2021 | Beddus | ................... | G06F 8/61 |
| 2021/0400074 A1* | 12/2021 | Smith | ................ | H04L 63/1408 |
| 2023/0231847 A1* | 7/2023 | Ng | .......................... | H04L 63/20 |
| | | | | 726/4 |

FOREIGN PATENT DOCUMENTS

| | | | | | |
|---|---|---|---|---|---|
| CN | 113704767 A | * | 11/2021 | | |
| CN | 114039742 A | * | 2/2022 | | |
| CN | 110399718 B | * | 1/2023 | ............. | G06F 21/52 |
| WO | WO-0070463 A1 | * | 11/2000 | ............. | G06F 21/57 |

OTHER PUBLICATIONS

Zhao, L., Mei, S., Zhong, W. "An Economic Analysis of the Interaction Between Firewall, IDS, and Vulnerability Scan". Economic Computation and Economic Cybernetics Studies and Research, Issue Apr. 2015. pp. 323-340. 2015. (Year: 2015).*

* cited by examiner

300

400

700

VULNERABILITY RESULT INTEGRATION SCHEME

CROSS-REFERENCE TO RELATED APPLICATION

The present application is a continuation-in-part of pending U.S. application Ser. No. 17/706,828 titled "Complementary Scan Engine Scheme," filed on Mar. 29, 2022, the entire disclosure of which is incorporated herein by reference in its entirety.

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g., data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

There are typically two approaches to asset vulnerability detection. A "local" scanning approach utilizes an application (e.g., an "agent") running on an asset (e.g., a computer, an Internet of Things (IoT) device, or network device, etc.) when performing a vulnerability scan. By contrast, an "external" scanning approach may perform a vulnerability scan of the asset via remote network connections. These two approaches may not produce the same set of results, and each approach has its own advantages and disadvantages.

SUMMARY OF EMBODIMENTS

The systems and methods described herein may be employed in various combinations and in embodiments to implement a complementary scan engine scheme for avoiding redundant vulnerability check data collection when using a scan engine to scan a target asset. Responsive to a determination that a local scan agent is functioning, the scan engine may be utilized to perform any vulnerability check, in a set of potential vulnerability checks, that is not covered by the local scan agent. Responsive to a determination that the local scan agent is not functioning, the scan engine may be utilized to perform all vulnerability checks in the set of potential vulnerability checks.

Additionally or alternatively, the systems and methods described herein may be employed in various combinations and in embodiments to implement a vulnerability result integration scheme for determining whether to integrate a respective vulnerability result into one or more databases. Various embodiments may include determining at least one integration state. According to the vulnerability result integration scheme, the at least one integration state may define whether an integrator is to integrate the respective vulnerability result into the database(s).

Figure 1:
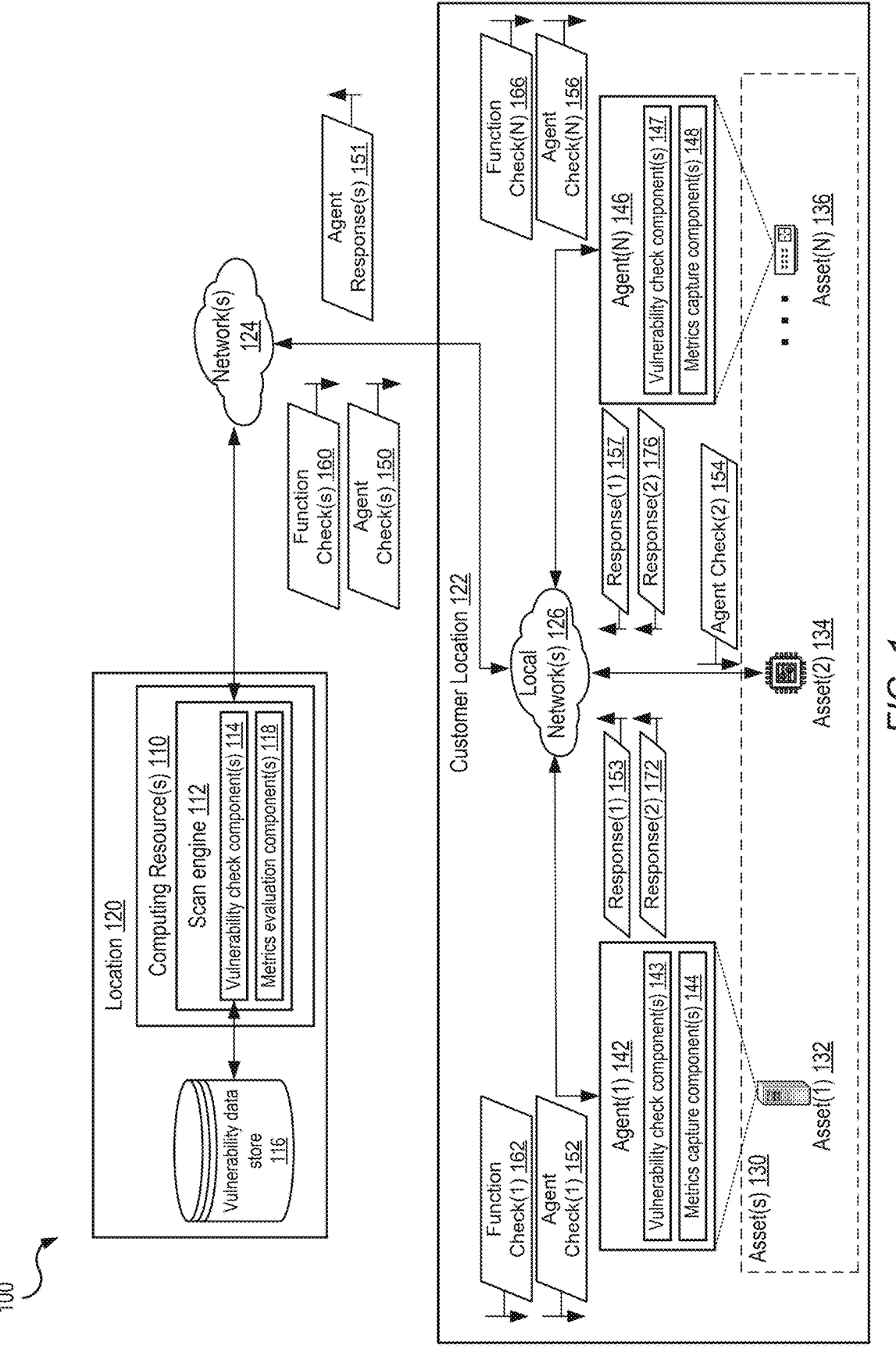
FIG. 1 is a block diagram illustrating an example system that implements a complementary scan engine scheme for avoiding redundant vulnerability check data collection when using a scan engine to scan a target asset, in accordance with some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The present disclosure describes systems and methods of implementing a complementary scan engine scheme for avoiding redundant vulnerability check data collection when using a scan engine to scan a target asset.

One step of a scan is to run a series of "checks" (also referred to herein as "vulnerability checks") that perform and collect data related to a particular asset. Local and external approaches to scanning are not mutually exclusive and can be used in conjunction, in some cases. An advantage of a local scan is that it is generally considered relatively "lightweight" in that it is less disruptive than an external scan to both the asset and the network environment. Further, a local scanning approach may provide the ability to monitor the asset more effectively and may not perform vulnerability check data collection when already under a relatively heavy load. With respect to an external scan, it can be run and configured for a single location and may be relatively easy for users to administer. Further, an external scanning approach may be advantageous in that it may provide the ability to collect detailed network information that may otherwise not be collected when using a local scanning approach. This is due to the fact that there are many types of devices that cannot, as a practical matter, run a local agent.

From a customer's perspective, the "weight" discrepancy in terms of scan impact and resource requirements may be significant. In cases where a local agent is deployed and an external scan is being used, there may be an additional issue in that there may be an "overlapping set" of data that is collected, thereby reducing the overall efficiency of the scan. The present disclosure may mitigate this efficiency issue by interrogating the local agent to determine whether a particular scan involves collection of data from the "overlapping set" of data. If the particular scan does not involve the collection of such data, the systems and methods of the present disclosure may advantageously provide improved efficiency by skipping that stage of data collection (on supported assets).

The systems and methods of the present disclosure provide the ability for an external scanning system (e.g., a scan engine external to the asset) to coordinate its scan of an asset with a local agent that is running on the asset, thereby allowing for a more efficient scan. As described herein, the present disclosure may provide the ability for a scan engine to interrogate a local agent on an asset regarding its scan performance and history. Based on this information from the local agent, the scan engine may perform a set of external scanning operations on the asset or may refrain from performing at least a subset of the external scanning operations.

Vulnerability check content may be stored in content files (also referred to herein as "vulnerability check" or "vck" files) which may be loaded by a scan engine separately from a code base that defines a vulnerability and that identifies particular items to be verified to determine whether a particular vulnerability is associated with a given target asset. Such vulnerability check files may be processed into a series of rules for a rules engine in order to process data collected from the given target asset in an efficient manner. In some cases, an action may be triggered responsive to particular conditions for a given rule being satisfied. According to some embodiments, the rules for the rules engine may be modified in memory by the engine in cases where: (i) an agent/scan engine complementary scan scheme option is enabled; and (ii) the particular vulnerability check is applicable to the local agent as well. In cases where the local agent has already collected data for performing the particular vulnerability check, the scan engine may refrain from performing the particular vulnerability check.

As described herein, scanning a system may involve the collection of "fingerprints" (also referred to herein as versions) of particular software installed on a given target asset. When the target asset being scanned contains a particular fingerprint (e.g., an agent fingerprint from Rapid7, Inc.) and the agent/scan engine complementary scan scheme option is enabled, collection of data related to the status or "health" of the agent process on the system may be enabled. In such cases, when the local agent is considered "healthy"/"functioning" (e.g., running, collecting, and uploading data as per a defined agent schedule), the scan engine may provide an indication to the rules engine that the agent is "healthy"/ "functioning" and that a set of rules that are covered by data collected from the agent can be skipped.

The systems and methods described herein may additionally or alternatively be employed in various combinations and in embodiments to implement a vulnerability result integration scheme for determining whether to integrate a respective vulnerability result into one or more databases. Various embodiments may include determining at least one integration state. According to the vulnerability result integration scheme, the at least one integration state may define whether an integrator is to integrate the respective vulnerability result into the database(s).

Among various advantages of the approaches described herein, the systems and methods of the present disclosure may improve the efficiency of scans by reducing the central processing unit (CPU), memory, network throughput and/or data storage utilization relative to a conventional external scan. Additionally, the systems and methods of the present disclosure may improve the efficiency of scans by reducing the amount of time to perform a scan of an asset. To illustrate, external scanning of network assets utilizes CPU cycles on both the scanning and scanned system. Accordingly, usage of any cycles on any intermediate network routing equipment may be eliminated for each vulnerability check that is removed from a typical set of external scanning operations and that is no longer performed.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, and components have not been described in detail so as not to unnecessarily obscure aspects of the embodiments.

Referring to FIG. 1, a block diagram illustrates various components of an example system 100 that implements a complementary scan engine scheme for avoiding redundant vulnerability check data collection when using a scan engine to scan a target asset, in accordance with some embodiments.

Figure 5:
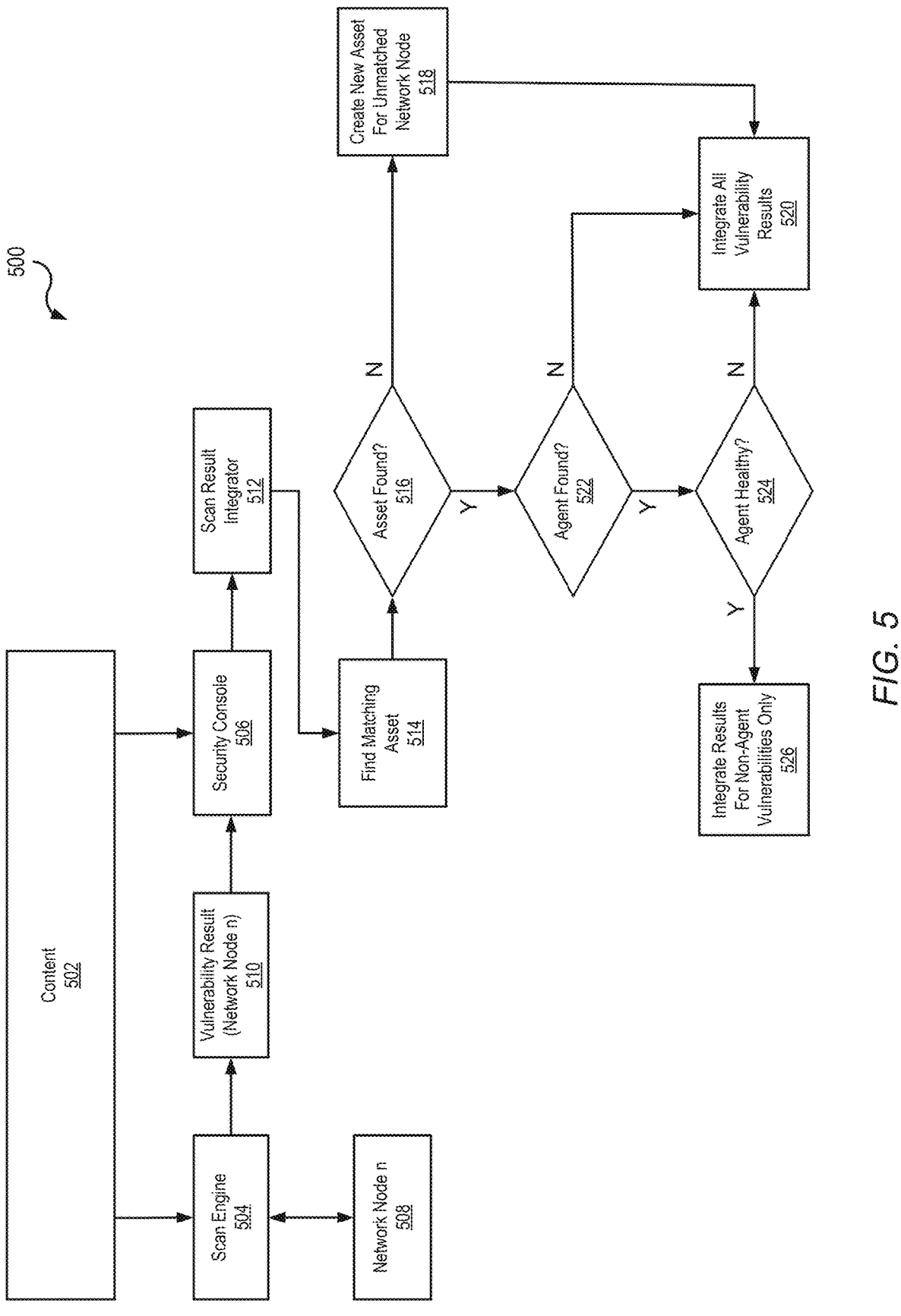
FIG. 5 is a block diagram representing a process flow that illustrates an example implementation of a vulnerability result integration scheme, in accordance with some embodiments.

FIG. 1 depicts one or more computing resources 110, which may include one or more hardware processors with associated memory (not shown, see e.g., FIG. 5). The computing resource(s) 110 may be configured to implement a process of implementing a complementary scan engine scheme for avoiding redundant vulnerability check data collection when using a scan engine to scan a target asset. FIG. 1 illustrates that the computing resource(s) 110 may include: a scan engine 112; one or more vulnerability check components 114; a vulnerability data store 116; and one or more metrics evaluation components 118.

According to various embodiments, FIG. 1 illustrates that the scan engine 112 may be configured to determine a set of potential vulnerability checks for scanning a target asset using the scan engine 112. In FIG. 1, the scan engine 112 is located at a location 120, which may be a customer location 122 or a different location (e.g., a remote location with respect to the customer location 122). The scan engine 112 may communicate information to assets in the customer location 122 via a combination one or more networks 124 external to the customer location 122 and/or one or more local networks 126 at the customer location 126 (e.g., one or more local area networks). In the particular embodiment depicted in FIG. 1, one or more assets 130 (accessible via the one or more local networks 126) are depicted at the customer location 112, including: a first asset 132, a second asset 134, up to an Nth asset 136.

According to some embodiments, FIG. 1 illustrates that: a first local scan agent 142 may be associated with the first asset 132; the second asset 134 may not contain a local scan agent; and an Nth local scan agent 146 may be associated with the Nth asset 136. According to some embodiments, FIG. 1 illustrates that the first local agent 142 associated with the first asset 132 at the customer location 122 may contain various components, including at least: one or more vulnerability check components 143 and one or more metrics capture components 144. According to some embodiments, FIG. 1 illustrates that the Nth local scan agent 146 associated with the Nth asset 136 at the customer location 122 may also contain various components, including at least: one or more vulnerability check components 147 and one or more metrics capture components 148.

According to some embodiments, FIG. 1 illustrates that the scan engine 112 may be configured to interrogate individual assets by communicating one or more agent checks 150 to the individual assets. For example, according to some embodiments, the scan engine 112 may be configured to communicate a first agent check 152 to the first asset 132. As another example, according to some embodiments, the scan engine 112 may be configured to communicate a second agent check 155 to the second asset 134. As yet another example, according to some embodiments, the scan engine 112 may be configured to communicate an Nth agent check 156 to the Nth asset 146.

FIG. 1 illustrates that the various local scan agents and/or the assets at the customer location 122 (e.g., the first local scan agent 142 and the Nth local scan agent 146) may be configured to communicate one or more agent responses 151 to the scan engine 112. For example, FIG. 1 illustrates that, responsive to the first agent check 152, the first local scan agent 142 and/or the first asset 132 may be configured to communicate a first response 153 to the scan engine 112. To illustrate, the first response 153 from the first local scan agent 142 (and/or from the first asset 132) may include at least information indicating to the scan engine 112 that the first local scan agent 142 is present and active at the first asset 132. As another example, FIG. 1 illustrates that, responsive to the Nth agent check 156, the Nth local scan agent 146 (and/or the Nth asset 136) may be configured to communicate a first response 157 to the scan engine 112. To illustrate, the first response 157 from the Nth local scan agent 156 (and/or from the Nth asset 136) may include at least information indicating to the scan engine 112 that the Nth local scan agent 146 is present and active at the Nth asset 136.

According to some embodiments, FIG. 1 illustrates that, in cases where a local scan agent is deployed and an external scan is being used, there may be an additional issue in that there may be an "overlapping set" of data that is collected, thereby reducing the overall efficiency of the scan. The system 100 of FIG. 1 may mitigate this efficiency issue by interrogating the local scan agent to determine whether a particular scan involves collection of data from the "overlapping set" of data. If the particular scan does involve the collection of such data, the system 100 of FIG. 1 may advantageously provide improved efficiency by skipping that stage of data collection (on supported assets).

According to some embodiments, the system 100 of FIG. 1 may provide the ability for the scan engine 112 to coordinate its scan of a particular asset with a local scan agent that is running on the particular asset, thereby allowing for a more efficient scan. To illustrate, the system 100 of FIG. 1 may provide the ability for the scan engine 112 to interrogate a local scan agent associated with a particular asset regarding its scan performance and history. Based at least in part on this information from the local scan agent, the scan engine 112 may perform a set of external scanning operations on the asset or may refrain from performing at least a subset of the external scanning operations.

According to some embodiments, FIG. 1 illustrates that scanning a system may involve the collection of "fingerprints" (also referred to herein as versions) of particular software installed on a given target asset. When the target asset being scanned contains a particular fingerprint (e.g., an agent fingerprint from Rapid7, Inc.) and the agent/scan engine complementary scan scheme option is enabled, collection of data related to the status or "health" of the agent process on the system may be enabled. In such cases, when the local scan agent is considered "healthy"/"functioning" (e.g., running, collecting, and uploading data as per a defined agent schedule), the scan engine 112 may provide an indication to the rules engine that the agent is "healthy"/ "functioning" and that a set of rules that are covered by data collected from the local scan agent can be skipped by the scan engine 112. FIG. 1 illustrates that the scan engine 112 may be configured to interrogate individual local scan agents (and/or individual assets) by communicating one or more function checks 160 to the individual local scan agents (and/or to individual assets).

Figure 2A:
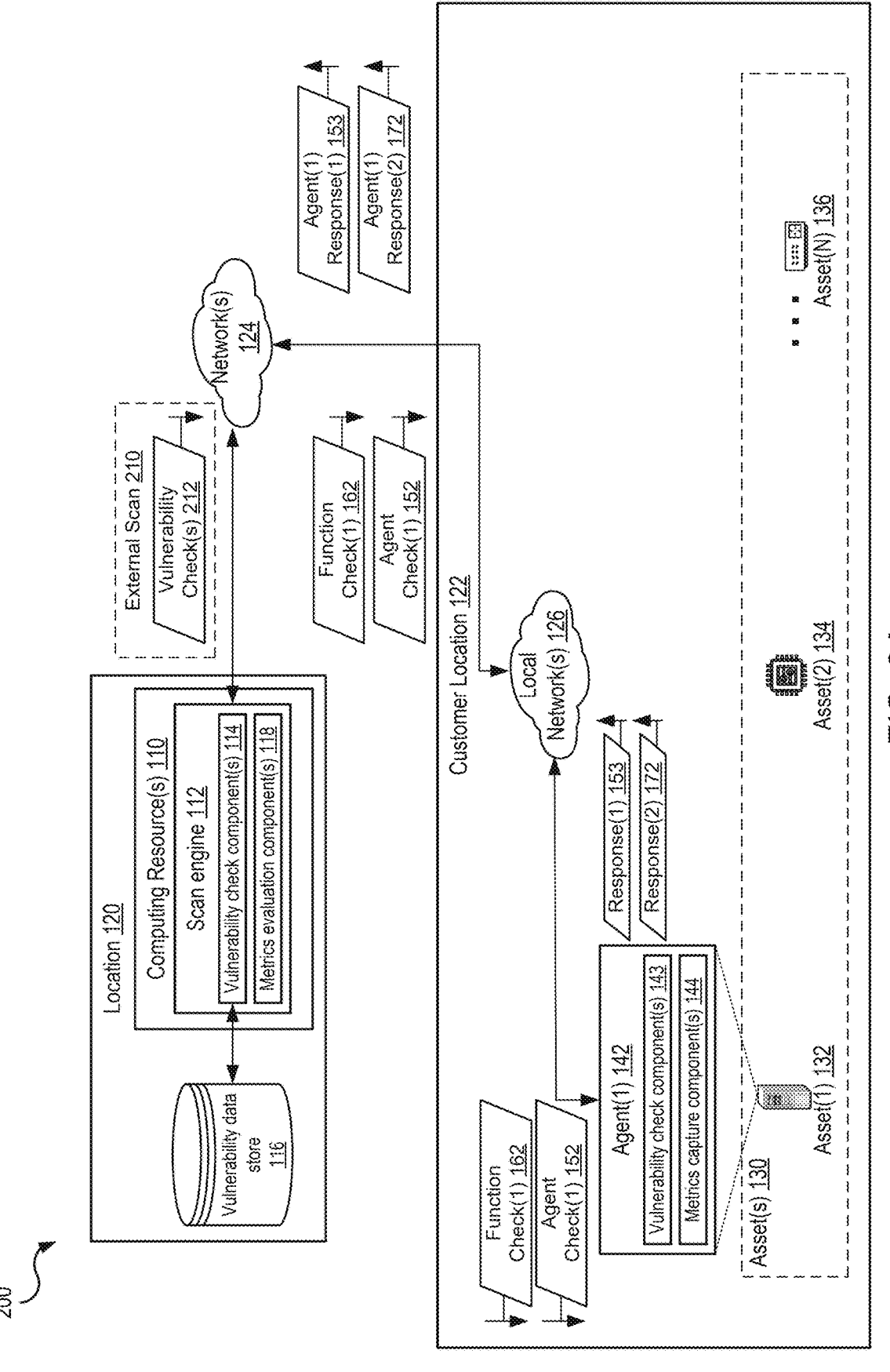
FIG. 2A is a block diagram illustrating an example system that implements a complementary scan engine scheme for avoiding redundant vulnerability check data collection when using a scan engine to scan a target asset, in accordance with some embodiments. In this example, the system may perform an evaluation of a local scan agent (e.g., installed on the target asset) that results in an external scan being performed by the scan engine for the target asset, in accordance with some embodiments.

For example, FIG. 1 illustrates that the scan engine 112 may be configured to interrogate the first local agent 142 associated with the first asset 132 by communicating one or more function checks 160 to the first local scan agent 142. For example, the function check(s) 160 may be used to check on the health status of the first local scan agent 142. The metrics capture component(s) 144 of the first local scan agent 142 may be configured to capture information regarding its scan performance and history, which may be communicated to the scan engine 112 as a second response 172. The information included in the second response 172 from the first local scan agent 142 may be evaluated by the metrics evaluation component(s) 118 of the scan engine 112, e.g., to determine whether the first local scan agent 142 is "healthy"/"functioning". Based on this evaluation, the scan engine 112 may be configured to determine whether to perform a set of external scanning operations on the first asset 132 or to refrain from performing at least a subset of the external scanning operations. As described herein, FIG. 2A depicts an example of a particular embodiment in which the evaluation results in an external scan 210 being performed by the scan engine 112 for the first asset 132. In alternative embodiments, such as the example depicted in FIG. 2C for the Nth asset 136, the evaluation results may result in a hybrid external/local scan being performed for the Nth asset 136.

Figure 2B:
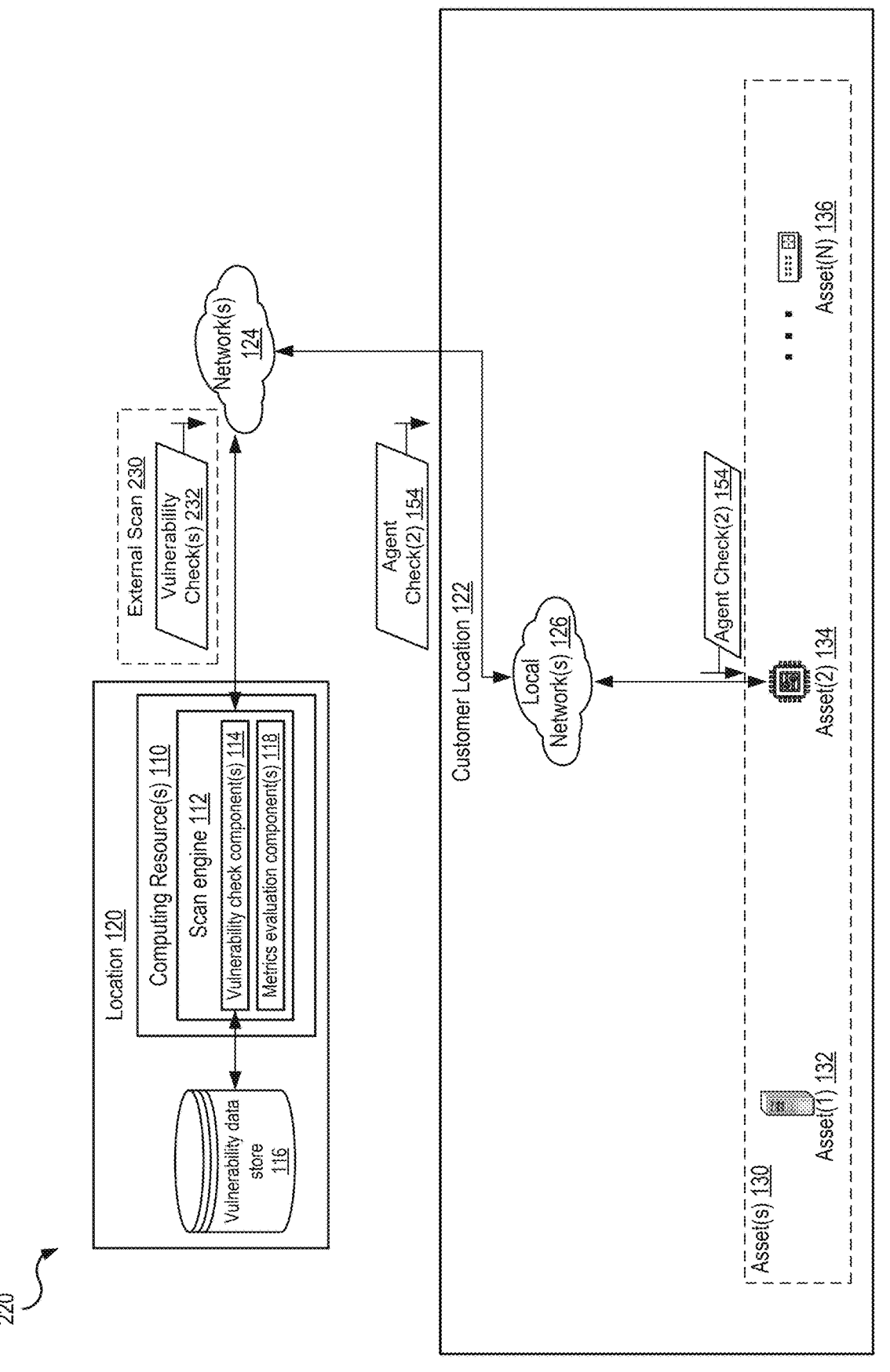
FIG. 2B is a block diagram illustrating an example system that implements a complementary scan engine scheme for avoiding redundant vulnerability check data collection when using a scan engine to scan a target asset, in accordance with some embodiments. In this example, the system may determine that there is no local scan agent present at the target asset, and thus an external scan may be performed by the scan engine for the target asset, in accordance with some embodiments.

As another example, FIG. 1 illustrates that the scan engine 112 may not communicate such function checks to the second asset 134 as the second agent check 154 was indicative of no local agent being present and active at the second asset 134. As described herein, FIG. 2B depicts an example of a particular embodiment of an external scan 230 being performed by the scan engine 112 for the second asset 134.

Figure 2C:
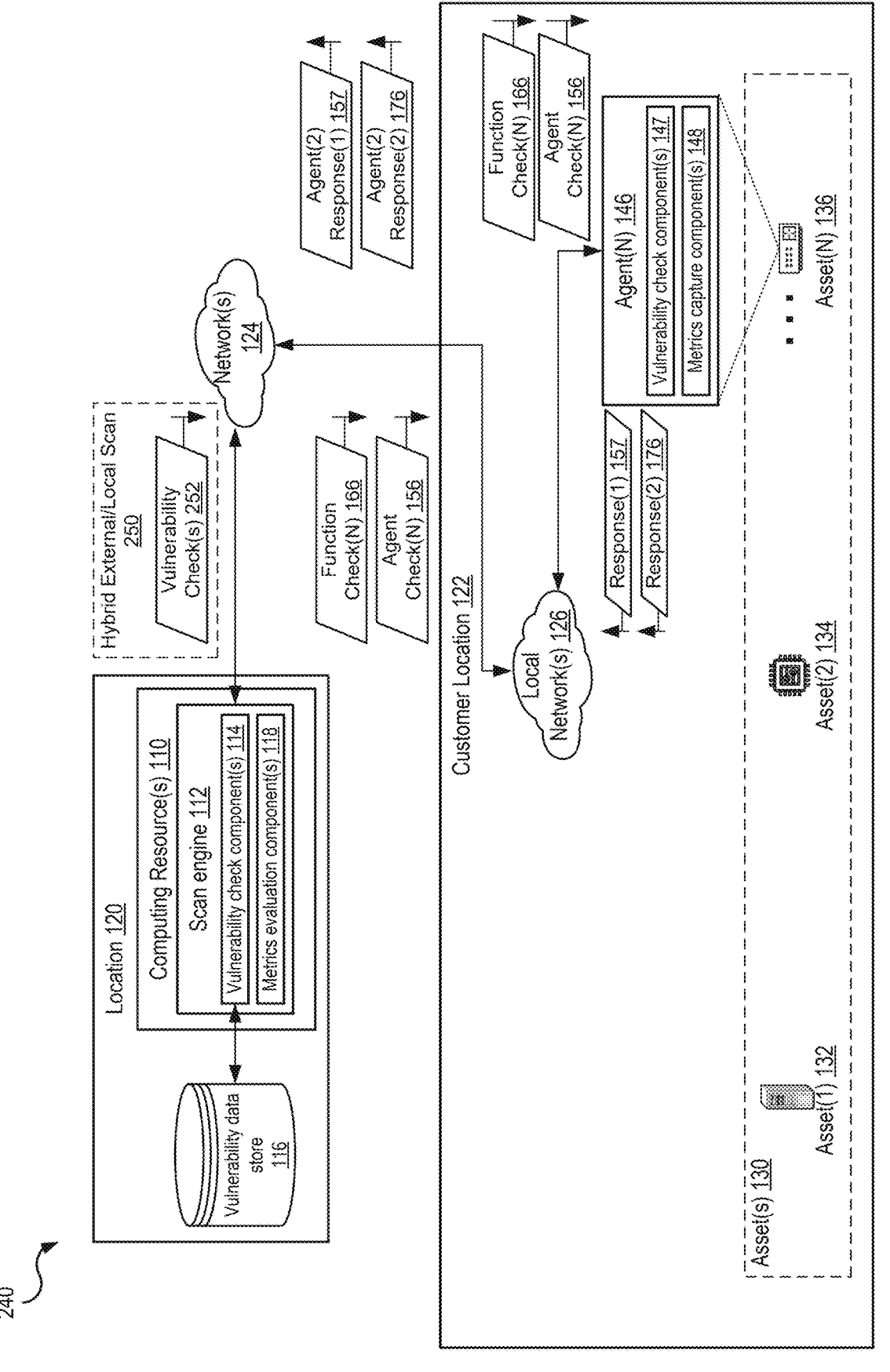
FIG. 2C is a block diagram illustrating an example system that implements a complementary scan engine scheme for avoiding redundant vulnerability check data collection when using a scan engine to scan a target asset, in accordance with some embodiments. In this example, the system may perform an evaluation of a local scan agent (e.g., installed on the target asset) that results in a hybrid external/local scan being performed for the target asset, in accordance with some embodiments.

As yet another example, FIG. 1 illustrates that the scan engine 112 may be configured to interrogate the Nth local scan agent 146 associated with the Nth asset 136 by communicating one or more function checks 166 to the Nth local scan agent 146. The metrics capture component(s) 148 of the Nth local scan agent 146 may be configured to capture information regarding its scan performance and history, which may be communicated to the scan engine 112 as a second response 176. The information included in the second response 176 from the Nth local scan agent 146 may be evaluated by the metrics evaluation component(s) 118 of the scan engine 112, e.g., to determine whether the Nth local scan agent 146 is "healthy"/"functioning". Based on this evaluation, the scan engine 112 may be configured to determine whether to perform a set of external scanning operations on the Nth asset 136 or to refrain from performing at least a subset of the external scanning operations. As described herein, FIG. 2C depicts an example of a particular embodiment in which the evaluation results in a hybrid external/local scan 250 being performed by the scan engine 112 for the Nth asset 136. In alternative embodiments, such as the example depicted in FIG. 2A for the first asset 132, the evaluation results may result in a fully external scan being performed for the Nth asset 136.

According to some embodiments, FIG. 1 illustrates that vulnerability check content may be stored in content files (also referred to herein as "vulnerability check" or "vck" files) in the vulnerability data store 116. The vulnerability check component(s) 114 of the scan engine 112 may load the vulnerability check files separately from a code base that defines a vulnerability and that identifies particular items to be verified to determine whether a particular vulnerability is associated with a given target asset. Such vulnerability check files may be processed into a series of rules for a rules engine in order to process data collected from the given target asset in an efficient manner. In some cases, an action may be triggered responsive to particular conditions for a given rule being satisfied. According to some embodiments, the rules for the rules engine may be modified in memory by the scan engine 112 in cases where: (i) an agent/scan engine complementary scan scheme option is enabled; and (ii) the particular vulnerability check is applicable to the local scan agent as well. In cases where the local scan agent has already collected data for performing the particular vulnerability check, the scan engine 112 may refrain from performing the particular vulnerability check.

Among various advantages, the system 100 of FIG. 1 may improve the efficiency of scans by reducing the CPU, memory, network throughput and/or data storage utilization relative to a conventional external scan. Additionally, the system 100 of FIG. 1 may improve the efficiency of scans by reducing the amount of time to perform a scan of an asset. To illustrate, external scanning of network assets utilizes CPU cycles on both the scanning and scanned system. Accordingly, usage of any cycles on any intermediate network routing equipment may be eliminated for each vulnerability check that is removed from a typical set of external scanning operations and that is no longer performed.

Thus, the system 100 depicted in FIG. 1 represents an example of a system that implements a complementary scan engine scheme for avoiding redundant vulnerability check data collection when using a scan engine to scan a target asset.

FIG. 2A is a block diagram 200 that illustrates an example process of implementing a complementary scan engine scheme for avoiding redundant vulnerability check data collection when using a scan engine to scan a target asset, in accordance with some embodiments.

According to various embodiments, FIG. 2A illustrates that the scan engine 112 may be configured to determine a set of potential vulnerability checks for scanning the first target asset 132 using the scan engine 112. According to some embodiments, FIG. 2A illustrates that the scan engine 112 may be configured to interrogate the first local scan agent 142 and/or the first asset 132 at the customer location 122 by communicating the first agent check 152 to the first asset 132. FIG. 2A illustrates that, responsive to the first agent check 152, the first local scan agent 142 and/or the first asset 132 may be configured to communicate the first response 153 to the scan engine 112. To illustrate, the first response 153 from the first local scan agent 142 (and/or from the first asset 132) may include at least information indicating to the scan engine 112 that the first local scan agent 142 is present and/or active at the first asset 132.

FIG. 2A illustrates that the scan engine 112 may interrogate the first local scan agent 142 associated with the first asset 132 by communicating the first function check 162 to the first local scan agent 142. The metrics capture component(s) 144 of the first local scan agent 142 may capture information regarding its scan performance and history, which may be communicated to the scan engine 112 as the second response 172. The information included in the second response 172 from the first local scan agent 142 may be evaluated by the metrics evaluation component(s) 118 of the scan engine 112. Based on this evaluation, the scan engine 112 may determine whether to perform a set of external scanning operations on the first asset 132 or to refrain from performing at least a subset of the external scanning operations. FIG. 2A depicts an example of a particular embodiment in which the evaluation results in a fully external scan 210 being performed by the scan engine 112 for the first asset 132. For example, the external scan 210 may be performed responsive to a determination that the first local scan agent 142 is not functioning, and the scan engine 112 may be utilized to perform all vulnerability checks 212 in the set of potential vulnerability checks.

Thus, FIG. 2A illustrates an example process of implementing a complementary scan engine scheme for avoiding redundant vulnerability check data collection when using a scan engine to scan a target asset. In FIG. 2A, an evaluation by the scan engine 112 results in the external scan 210 being performed for the first asset 132 at the customer location 122.

FIG. 2B is a block diagram 220 that illustrates an example process of implementing a complementary scan engine scheme for avoiding redundant vulnerability check data collection when using a scan engine to scan a target asset, in accordance with some embodiments.

According to various embodiments, FIG. 2B illustrates that the scan engine 112 may be configured to determine a set of potential vulnerability checks for scanning the second target asset 134 using the scan engine 112. According to some embodiments, FIG. 2B illustrates that the scan engine 112 may communicate the second agent check 154 to the second asset 134. FIG. 2B illustrates that, as there is no local agent present on the second asset 134, there is no response communicated to the scan engine 112. Accordingly, FIG. 2B depicts an example of a particular embodiment in which a fully external scan 230 is performed by the scan engine 112 for the second asset 134. That is, the scan engine 112 may perform all vulnerability checks 232 in the set of potential vulnerability checks.

FIG. 2C is a block diagram 240 that illustrates an example process of implementing a complementary scan engine scheme for avoiding redundant vulnerability check data collection when using a scan engine to scan a target asset, in accordance with some embodiments.

According to various embodiments, FIG. 2C illustrates that the scan engine 112 may be configured to determine a set of potential vulnerability checks for scanning the Nth target asset 136 using the scan engine 112. According to some embodiments, FIG. 2C illustrates that the scan engine 112 may be configured to interrogate the Nth local scan agent 146 and/or the Nth asset 136 at the customer location 122 by communicating the Nth agent check 156 to the Nth asset 136. FIG. 2C illustrates that, responsive to the Nth agent check 156, the Nth agent 146 may be configured to communicate the first response 157 to the scan engine 112. To illustrate, the first response 157 from the Nth local scan agent 146 (and/or from the Nth asset 136) may include at least information indicating to the scan engine 112 that the Nth agent 146 is present and/or active at the Nth asset 136.

FIG. 2C illustrates that the scan engine 112 may interrogate the Nth local scan agent 146 associated with the Nth asset 136 by communicating the Nth function check 166 to the Nth local scan agent 146. The metrics capture component(s) 148 of the Nth local scan agent 146 may capture information regarding its scan performance and history, which may be communicated to the scan engine 112 as the second response 176. The information included in the second response 176 from the Nth local scan agent 146 may be evaluated by the metrics evaluation component(s) 118 of the scan engine 112. Based on this evaluation, the scan engine 112 may determine whether to perform a set of external scanning operations on the Nth asset 136 or to refrain from performing at least a subset of the external scanning operations. FIG. 2C depicts an example of a particular embodiment in which the evaluation results in a hybrid external/local scan 250 being performed for the Nth asset 136.

Thus, FIG. 2C illustrates an example process of implementing a complementary scan engine scheme for avoiding redundant vulnerability check data collection when using a scan engine to scan a target asset. In FIG. 2C, an evaluation by the scan engine 112 results in the hybrid external/local scan 250 being performed for the Nth asset 136 at the customer location 122. For example, the scan engine 112 may perform a subset of vulnerability checks 252 in the set of potential vulnerability checks.

Figure 3:
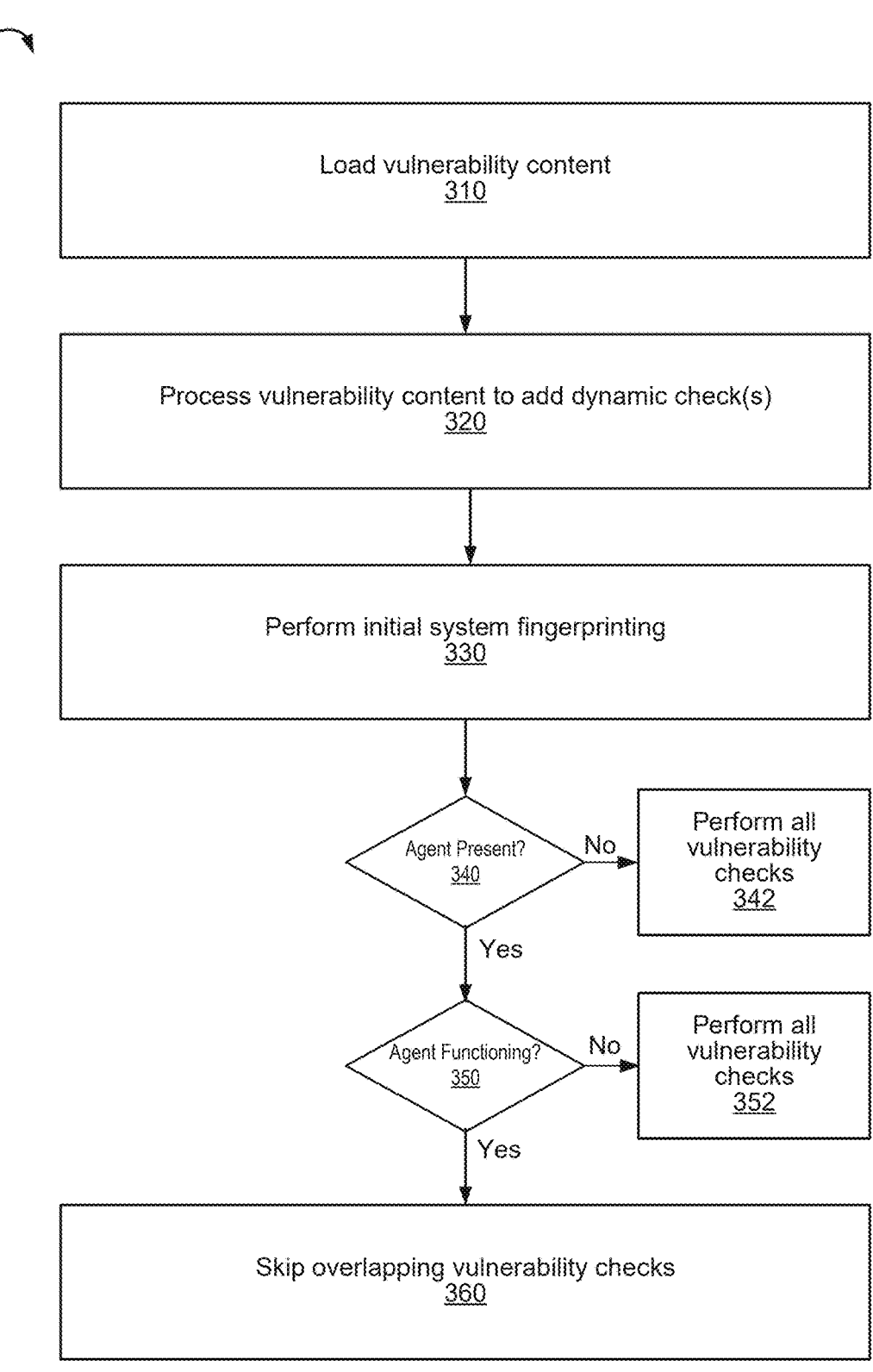
FIG. 3 is a flowchart that illustrates an example process of implementing a complementary scan engine scheme for avoiding redundant vulnerability check data collection when using a scan engine to scan a target asset, according to some embodiments.

FIG. 3 is a flowchart 300 that illustrates an example of a process of implementing a complementary scan engine scheme for avoiding redundant vulnerability check data collection when using a scan engine to scan a target asset, according to some embodiments. In FIG. 3, one or more hardware processors may be utilized to implement the complementary scan engine scheme.

At operation 310, the process includes loading vulnerability content. For example, referring to FIG. 1, the vulnerability check component(s) 114 of the scan engine 112 may load vulnerability content from the vulnerability data store 116.

At operation 320, the process includes processing vulnerability content to add one or more dynamic checks. For example, referring to FIG. 1, the vulnerability check component(s) 114 of the scan engine 112 may process the vulnerability content from the vulnerability content store 116 to add one or more dynamic checks.

At operation 330, the process includes performing initial system fingerprinting. For example, referring to FIG. 1, the scan engine 112 may perform initial system fingerprinting of each of the local assets 132, 134, and 136 at the customer location 122.

At operation 340, the process includes determining whether a local scan agent is present at a target asset. FIG. 3 illustrates that, responsive to determining that no agent is present at operation 340, the process may proceed to operation 342 to perform all vulnerability checks. For example, referring to FIG. 1, responsive to determining that no local scan agent is present at the second asset 134, the process may proceed to operation 342 to perform, using the scan engine 112, all vulnerability checks (depicted as the external scan 230 in FIG. 2B).

FIG. 3 further illustrates that, responsive to determining that a local scan agent is present at operation 340, the process may proceed to operation 350. For example, referring to FIG. 1, the scan engine 112 may determine that the first local scan agent 142 is present at the first asset 132 based on the first response 153 from the first local scan agent 142 that is received responsive to the first agent check 152. As another example, referring to FIG. 1, the scan engine 112 may determine that the Nth local scan agent 146 is present at the Nth asset 136 based on the first response 157 from the Nth local scan agent 146 that is received responsive to the Nth agent check 156.

At operation 350, the process may include determining whether the local scan agent is functioning. FIG. 3 illustrates that, responsive to determining that the agent is not functioning, the process may proceed to operation 352 to perform, using the scan engine 112, all vulnerability checks. For example, referring to FIG. 2A, the scan engine 112 may determine that the first local scan agent 142 associated with the first asset 132 is not functioning. Accordingly, as depicted in FIG. 2A, this determination may result in the fully external scan 210 being performed by the scan engine 112 for the first asset 132.

FIG. 3 further illustrates that, responsive to determining that the local scan agent is functioning at operation 350, the process may proceed to operation 360. For example, referring to FIG. 2C, the scan engine 112 may determine that the Nth local scan agent 146 associated with the Nth asset 136 is functioning properly. Accordingly, as depicted in FIG. 2C, this determination may result in the hybrid external/local scan 250 being performed for the Nth asset 136.

At operation 360, the process may include skipping overlapping vulnerability checks. For example, referring to FIG. 2C, the hybrid external/local scan 250 may include the scan engine 112 skipping one or more of the set of potential vulnerability check(s) for the Nth asset 136 and performing a subset of the potential vulnerability checks that are not covered by vulnerability check data collection attributable to the Nth local scan agent 146.

Thus, FIG. 3 illustrates an example of a process of implementing a complementary scan engine scheme for avoiding redundant vulnerability check data collection when using a scan engine to scan a target asset.

Figure 4:
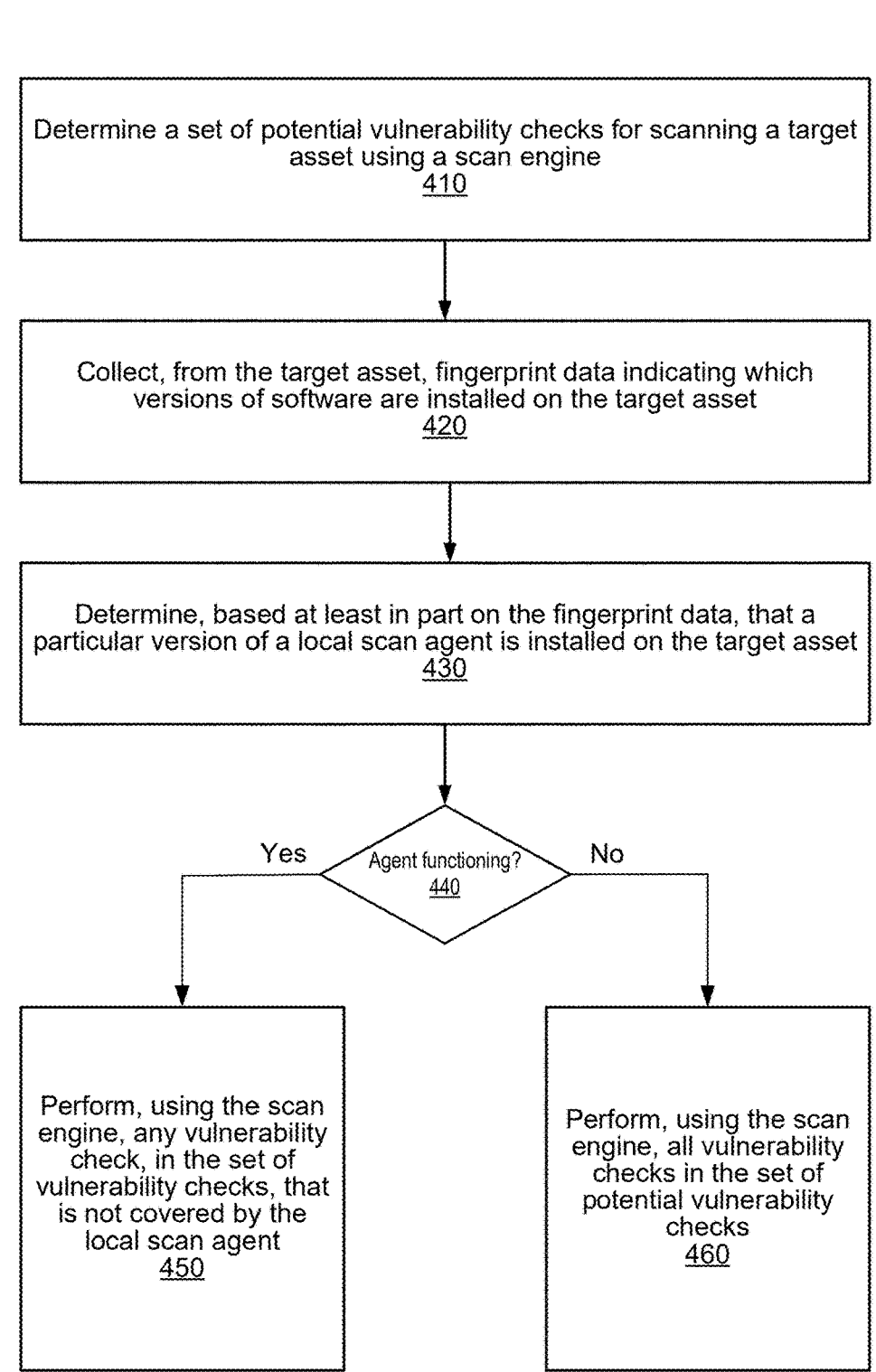
FIG. 4 is a flowchart that illustrates an example process of implementing a complementary scan engine scheme for avoiding redundant vulnerability check data collection when using a scan engine to scan a target asset, according to some embodiments.

FIG. 4 is a flowchart 400 that illustrates an example of a process of implementing a complementary scan engine scheme for avoiding redundant vulnerability check data collection when using a scan engine to scan a target asset, according to some embodiments. In FIG. 4, one or more hardware processors may be utilized to implement the complementary scan engine scheme.

At operation 410, the process includes determining a set of potential vulnerability checks for scanning a target asset using a scan engine. For example, referring to FIG. 1, the scan engine 112 may determine the one or more vulnerability checks 180 that represent a set of potential vulnerability checks for scanning a particular asset of the one or more assets 130 at the customer location 122. In various examples, the process may include loading vulnerability content associated with a scan of the target asset. The process may determine, based at least in part on the vulnerability check content, the set of potential vulnerability checks.

At operation 420, the process includes collecting, from the target asset, fingerprint data indicating which versions of software are installed on the target asset. For example, referring to FIG. 1, the scan engine 112 may communicate with the individual target assets 132, 134, and 136 at the customer location 122 to collect fingerprint data indicating which versions of software are installed on the individual target assets 132, 134, and 136, respectively.

At operation 430, the process includes determining, based at least in part on the fingerprint data, that a particular version of a local scan agent is installed on the target asset. For example, referring to FIG. 1, the scan engine 112 may determine that the first local scan agent 142 corresponds to a particular version of a local scan agent installed on the first asset 132. As another example, referring to FIG. 1, the scan engine 112 may determine that the Nth local scan agent 146 corresponds to a particular version of a local scan agent installed on the Nth asset 136.

At operation 440, the process includes determining whether the local scan agent is functioning. Responsive to a determination that the local scan agent is functioning, the process may proceed to operation 450. Responsive to a determination that the local scan agent is not functioning, the process may proceed to operation 460.

According to some examples, determining whether the local scan agent is functioning occurs at least partly responsive to determining that a complementary scan scheme option is enabled. Furthermore, responsive to determining that the complementary scan scheme is not enabled, the process may not determine whether the local scan agent is functioning, and the scan engine 112 may be used to perform all vulnerability checks in the set of potential vulnerability checks.

In some examples, to determine whether the local scan engine is functioning, the process may include collecting data indicative of a health status of the local scan agent. For example, as discussed herein with reference to FIGS. 1-2C, function checks may be used to obtain such data indicative of the health status of the local scan agent.

At operation 450, the process may include performing, using the scan engine, any vulnerability check, in the set of potential vulnerability checks, that is not covered by the local scan agent. For example, referring to FIG. 2C, performing the hybrid external/local scan 250 may include performing, using the scan engine 112, any vulnerability check, in the set of potential vulnerability checks, that is not covered by the Nth local scan agent 146 associated with the Nth asset 136.

In some examples, the process may include determining vulnerability check data collection attributable to the local scan agent. For example, the vulnerability check data collection attributable to the local scan agent may include: (i) a first set of vulnerability check data to be collected using the local scan agent, wherein the first set of vulnerability check data is sufficient for performing a first subset of the set of potential vulnerability checks; and/or (ii) a second set of vulnerability check data that has been collected using the local scan agent, wherein the second set of vulnerability check data is sufficient for performing a second subset of the set of potential vulnerability checks. Furthermore, the process may include determining a remainder subset, of the set of potential vulnerability checks, comprising one or more vulnerability checks that are not covered by the vulnerability check data collection attributable to the local scan agent. To perform, using the scan engine, any vulnerability check that is not covered by the local scan agent, the scan engine may be used to perform the remainder subset comprising the vulnerability check(s) that are not covered by the vulnerability check data collection attributable to the local scan agent.

In some examples, the vulnerability check data attributable to the local scan agent may be defined in vulnerability content as a meta property. For example, the vulnerability content may be loaded at least once per instance of the scan engine starting, and once per version of content per instance of the scan engine starting. When the vulnerability content is loaded, whether or not a particular vulnerability check is covered by a local scan agent would be known. According to some examples, upon initiating a scan, rules derived from the loaded vulnerability content may be processed/populated for the rules engine, and, if the complementary scan scheme option is enabled, the rules may be adjusted to allow for the functionality described herein related to skipping vulnerability checks that are covered by a local scan agent.

At operation 460, the process may include performing, using the scan engine, all vulnerability checks in the set of potential vulnerability checks. For example, referring to FIG. 2A, performing the external scan 210 may include performing, using the scan engine 112, all vulnerability checks, in the set of potential vulnerability checks, on the first asset 132.

Thus, FIG. 4 illustrates an example of a process of implementing a complementary scan engine scheme for avoiding redundant vulnerability check data collection when using a scan engine to scan a target asset.

FIG. 5 is a block diagram representing a process flow 500 that illustrates an example implementation of a vulnerability result integration scheme, in accordance with some embodiments. The vulnerability result integration scheme may be used to determine whether an integrator can skip integration of a vulnerability result of a scan engine under certain circumstances. For example, when a local scan agent is installed on an asset and is capable of obtaining data for a vulnerability check that is compatible for a particular vulnerability result of the scan engine, it may be advantageous to skip integration of that particular vulnerability result, as the reduction of set of vulnerability results to be integrated may improve system performance.

In various embodiments, content 502 may comprise a set of data (e.g., instructions for a scan engine 504, instructions for a security console 506, etc.). The scan engine 504 may receive content 502 and run vulnerability checks for one or more network nodes (e.g., network node n 508), which will produce vulnerability results. In various embodiments, each network node may correspond to an internet protocol (IP) address that was scanned. The security console 506 may receive vulnerability results (e.g., vulnerability result 510) from the scan engine 504. A scan result integrator 512 (also referred to herein as an "integrator") may used in implementing the vulnerability result integration scheme (also discussed herein with reference to FIGS. 6 and 7) to determine whether to integrate a vulnerability result into one or more databases (e.g., comprising a database for correlating vulnerability results with assets). In some embodiments, the security console 506 may include the integrator 512. However, the integrator 512 may be separate from the security console 506 in some embodiments. For example, the security console 506 and the integrator 512 may run in different processes and/or on different computing devices.

In some examples, the integrator 512 (and/or another component of an overall security platform/system) may attempt to find a matching asset (block 514), e.g., to determine whether a correlation exists (e.g., in the database(s)) between the network node n 508 and a particular asset. If, at operation 516, an asset is not found (e.g., it is determined that a correlation does not yet exist between the network node n 508 and an asset), then the integrator 512 (and/or another component of the security platform/system) may create a new asset for the unmatched network node (block 518). In various embodiments, the integrator 512 may integrate all vulnerability results (block 520) for the newly created asset.

If, at operation 516, an asset is found (e.g., it is determined that a correlation does exist between the network node n 508 and an asset), then the integrator 512 (and/or another component of the security platform/system) may determine whether an agent is found (e.g., check whether a local scan agent is installed on the asset), at operation 522. If, at operation 522, a local scan agent is not found, then the integrator 512 may integrate all vulnerability results (block 520) for the asset.

If, at operation 522, a local scan agent is found, then the integrator 512 may determine whether the local scan agent is healthy (e.g., determine whether the local scan agent is functioning, at operation 524. If, at operation 524, it is determined that the local scan agent is not healthy, then the integrator 512 may integrate all vulnerability results (block 520) for the asset.

If, at operation 524, it is determined that that the local scan agent is healthy, then the integrator 512 may integrate only those vulnerability results that are not covered by the local scan agent. For example, if the local scan agent is configured to obtain data for a vulnerability check that corresponds to a particular vulnerability result of the scan engine 504, then the integrator 512 may determine to "skip" that particular vulnerability result (e.g., refrain from integrating the particular vulnerability result into the database(s)) (block 526). As will be discussed herein with reference to FIGS. 6 and 7, one or more other determinations may additionally or alternatively impact determination of the at least one integration state, which may define, according to the vulnerability result integration scheme, whether to integrate a vulnerability result into the database(s).

Figure 6:
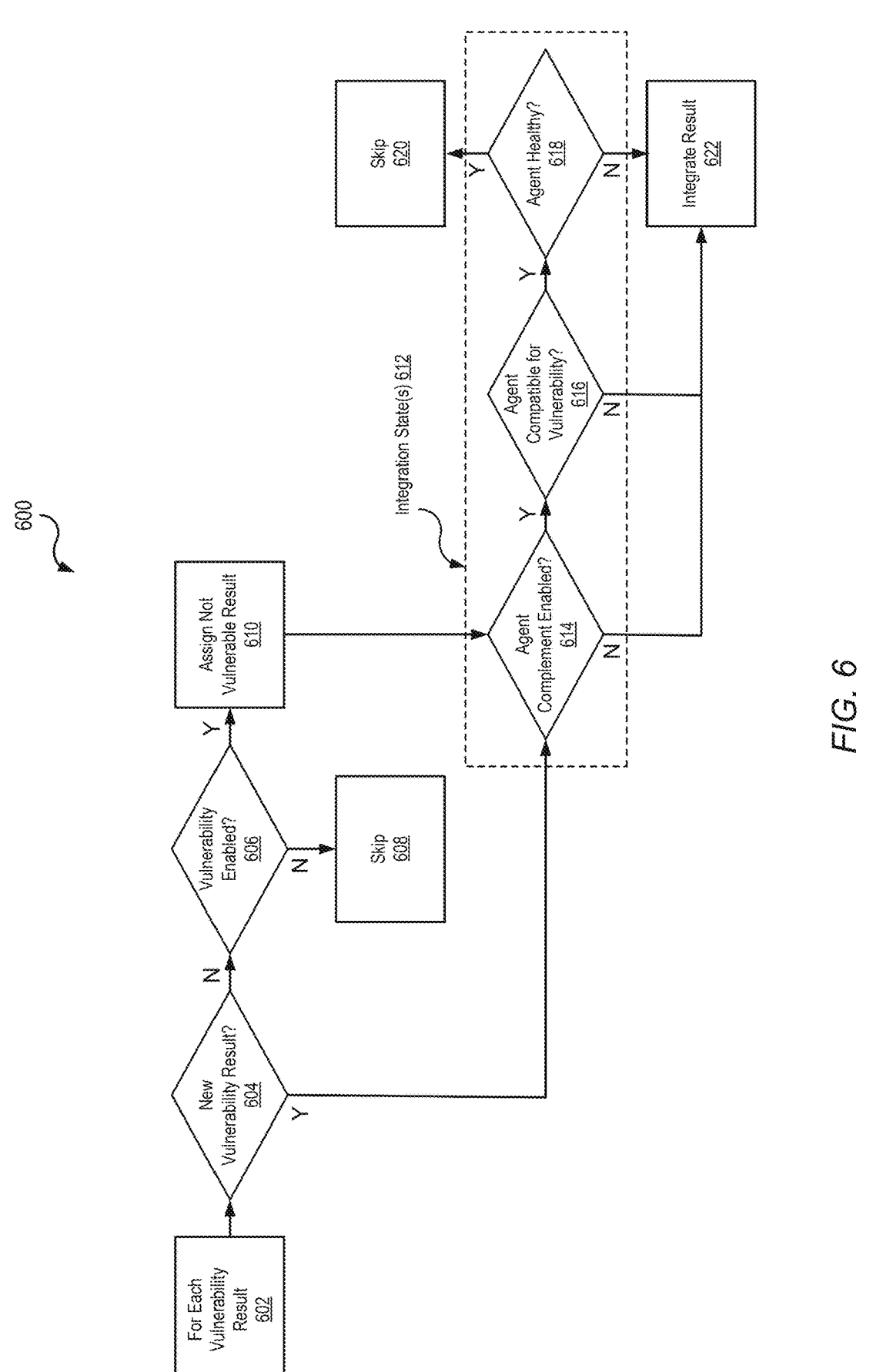
FIG. 6 is a block diagram representing another process flow that illustrates an example implementation of a vulnerability result integration scheme, in accordance with some embodiments.

FIG. 6 is a block diagram representing another process flow 600 that illustrates an example implementation of a vulnerability result integration scheme, in accordance with some embodiments. As indicated in FIG. 6, for each vulnerability result (block 602) for a respective asset, the integrator (e.g., integrator 512 in FIG. 5) (and/or another component in a security platform/system) may determine, at operation 605, whether the vulnerability result is a "new" vulnerability result. For example, the database(s) may be used to keep track of new and old vulnerability results for each asset. If a particular vulnerability result is not found in the database(s) in correlation with the respective asset, then the particular vulnerability result may be determined to be a new vulnerability result for the respective asset. If, at operation 604, it is determined that the vulnerability result is not a new vulnerability result, then it may be determined, at operation 606, whether a vulnerability corresponding to the vulnerability result is enabled in the respective asset. For example, the vulnerability may relate to a software feature that is not enabled or a version of software that is not installed, and thus the vulnerability may be considered not enabled. If, at 606, it is determined that the vulnerability is not enabled, then the integrator may skip (e.g., refrain from integrating into the database(s)) the vulnerability result (block 608).

If, at operation 604, it is determined that the vulnerability result is a new vulnerability result, then the process flow 600 may proceed to determining at least one integration state (e.g., integration state(s) 612), which may comprise one or more operations (e.g., operations 614, 616, and/or 618, etc.). If, at operation 606, it is determined that the vulnerability result is enabled, then the process flow 600 may include assigning a "not vulnerable" result and proceed to one or more operations for determining at least one integration state 612.

Determining the integration state(s) 612 may include determining whether an agent complement is enabled, at operation 614, which may correspond to determining whether a complementary scan scheme option is enabled. If, at operation 614, it is determined that the complementary scan scheme is enabled, then determining the integration state(s) 612 may include determining whether a local scan agent is installed on the respective asset and/or determining whether the local scan agent is configured to obtain data for a vulnerability check that is compatible for the vulnerability result of the scan engine. If, at operation 616, it is determined that a local scan agent is installed on the respective asset and that the local scan agent is configured to obtain data for a vulnerability check that is compatible for the vulnerability result of the scan engine, then determining the integration state(s) 612 may include determining whether the local scan agent is healthy (e.g., determining whether the local scan agent is functioning), at operation 618. If, at operation 618, it is determined that the local scan agent is healthy, then the determined integration state(s) 612 may instruct the integrator to skip (e.g., refrain from integrating into the database(s)) the vulnerability result (block 620).

If, at operation 614, it is determined that the complementary scan scheme option is not enabled, then the determined integration state(s) 612 may instruct the integrator to integrate the vulnerability result into the database(s) (block 622). Additionally or alternatively, if, at operation 616, it is determined that a local scan agent is not installed on the respective asset or that the local scan agent (if installed) is not configured to obtain data for a vulnerability check that is compatible for a vulnerability result of the scan engine, then the determined integration state(s) 612 may instruct the integrator to integrate the vulnerability result into the database(s) (block 622). Additionally or alternatively, if, at operation 618, it is determined that the local scan agent is not healthy (e.g., if the local scan agent is not functioning), then the determined integration state(s) 612 may instruct the integrator to integrate the vulnerability result into the database(s) (block 622).

Figure 7:
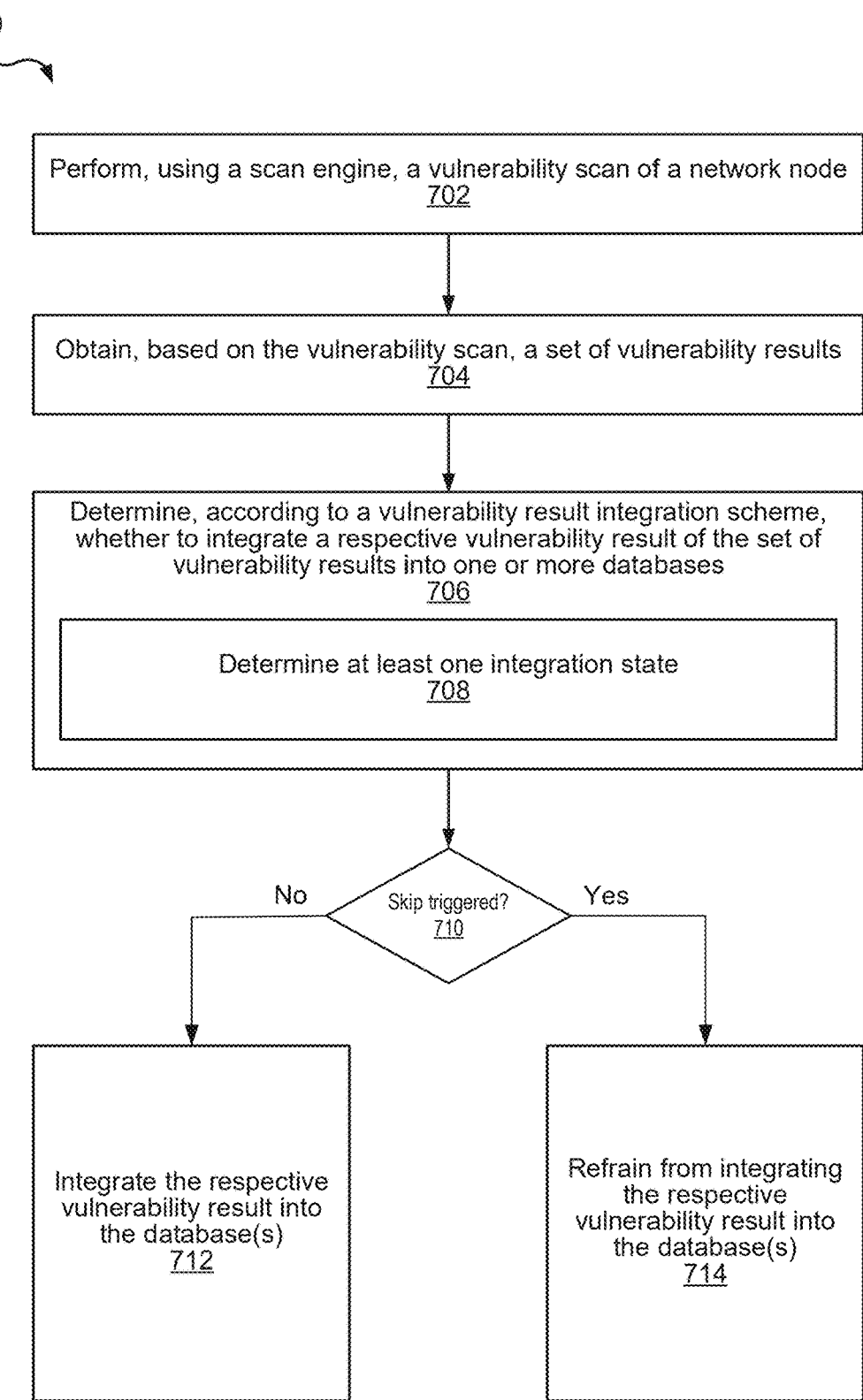
FIG. 7 is a flowchart that illustrates an example of a process of implementing a vulnerability result integration scheme, according to some embodiments.

FIG. 7 is a flowchart 700 that illustrates an example of a process of implementing a vulnerability result integration scheme, according to some embodiments. In FIG. 7, one or more hardware processors may be utilized to implement the vulnerability result integration scheme.

At operation 702, the process may include performing (e.g., using a scan engine) a vulnerability scan of a network node. For example, a network node may correspond to a particular internet protocol (IP) address. In some examples, a scan engine may comprise a local scan engine that runs on a same computing device as a security console. According to some examples, a local scan engine may run in the same process as the security console. In other examples, a scan engine may comprise a distributed scan engine and/or a remote scan engine that runs on a separate computing device than the security console. For example, the remote scan engine may run on a first computing device, and the security console may run on a second computing device that interacts with the first computing device (on which the remote scan engine runs) via a network communication protocol. It is contemplated that other formats (and/or combinations of formats) for scan engines (e.g., containerized scan engines) are within the scope of this disclosure and may be used in various embodiments. The security console may be configured to perform various functions, e.g., command, control, management, presentation, reporting, and/or integration functionality, etc. As a non-limiting example, a user interface of the security console may be used to present one or more vulnerability results.

At operation 704, the process may include obtaining, based on the vulnerability scan, a set of vulnerability results for the network node. In some examples, the process may include determining whether a correlation exists between the network node and a particular asset. Responsive to determining that a correlation does exist between the network node and a particular asset, the process may include determining whether a local scan agent is installed on the particular asset. Responsive to determining that the network node is not yet correlated with an asset, the process may include creating a new asset to correlate with the network node, and integrating the respective vulnerability result into the database(s).

At operation 706, the process may include determining whether to integrate a respective vulnerability result of the set of vulnerability results into one or more databases. In various examples, the determination of whether to integrate a respective vulnerability result into the database(s) may be in accordance with the vulnerability result integration scheme. Furthermore, to determine whether to integrate the respective vulnerability result into the database(s), the process may include determining at least one integration state, at operation 708. For example, according to the vulnerability result integration scheme, the at least one integration state may define whether an integrator is to integrate the respective vulnerability result into the database(s).

According to some examples, the at least one integration state may be determined based at least in part on an assessment of whether a complementary scan scheme option is enabled, whether a local scan agent is installed on an asset corresponding to the network node, whether a local scan agent check is compatible for a vulnerability check corresponding to the respective vulnerability result, and/or whether a local scan agent is functioning. Responsive to determining that a local scan agent is installed on a particular asset, the process may include determining whether the local scan agent is configured to obtain data compatible for a vulnerability check corresponding to the respective vulnerability result. Additionally or alternatively, responsive to determining that a local scan agent is installed on the particular asset, the process may include determining whether the local scan agent is functioning.

At operation 710, the process may include determining whether a skip (e.g., of using the scan engine to perform the respective vulnerability check) is triggered. In various examples, determining whether a skip is triggered may be based on the at least one integration state. For example, if a skip is not triggered by the at least one integration state, the process may include integrating the respective vulnerability result into the database(s), at operation 712. In some examples, the at least one integration state may not trigger a skip if the complementary scan scheme option is not enabled, a local scan agent is not installed on a particular asset, a local scan agent (if installed) is not configured to obtain data compatible for a vulnerability check corresponding to the respective vulnerability check, a local scan agent (if installed) is not functioning. In such cases, responsive to (i) a determination that the complementary scan scheme option is not enabled, (ii) a determination that a local scan agent is not installed on the particular asset, (iii) a determination that the local scan agent is not configured to obtain data compatible for a vulnerability check corresponding to the respective vulnerability result, or (iv) a determination that the local scan agent is not functioning, the process may include integrating the respective vulnerability result into the database(s).

If a skip is triggered by the at least one integration state, the process may include refraining from integrating the respective vulnerability result into the database(s), at operation 714. For example, the at least one integration state may indicate a determination that the respective vulnerability result is covered by a local scan agent, and, as a result, the process may refrain from integrating the respective vulnerability result into the database(s). In some examples, the at least one integration state may trigger a skip if the complementary scan scheme option is enabled, a local scan agent is installed on a particular asset, the local scan agent is configured to obtain data compatible for a vulnerability check corresponding to the respective vulnerability result, and the local scan agent is functioning. In such cases, responsive to: (i) a determination that the complementary scan scheme option is enabled, (ii) a determination that a local scan agent is installed on the particular asset, (iii) a determination that the local scan agent is configured to obtain data compatible for a vulnerability check corresponding to the respective vulnerability result, and (iv) a determination that the local scan agent is functioning, the process may include determining that the respective vulnerability result is covered by the local scan agent. Accordingly, the integrator may refrain from integrating the respective vulnerability result into the database(s).

Figure 8:
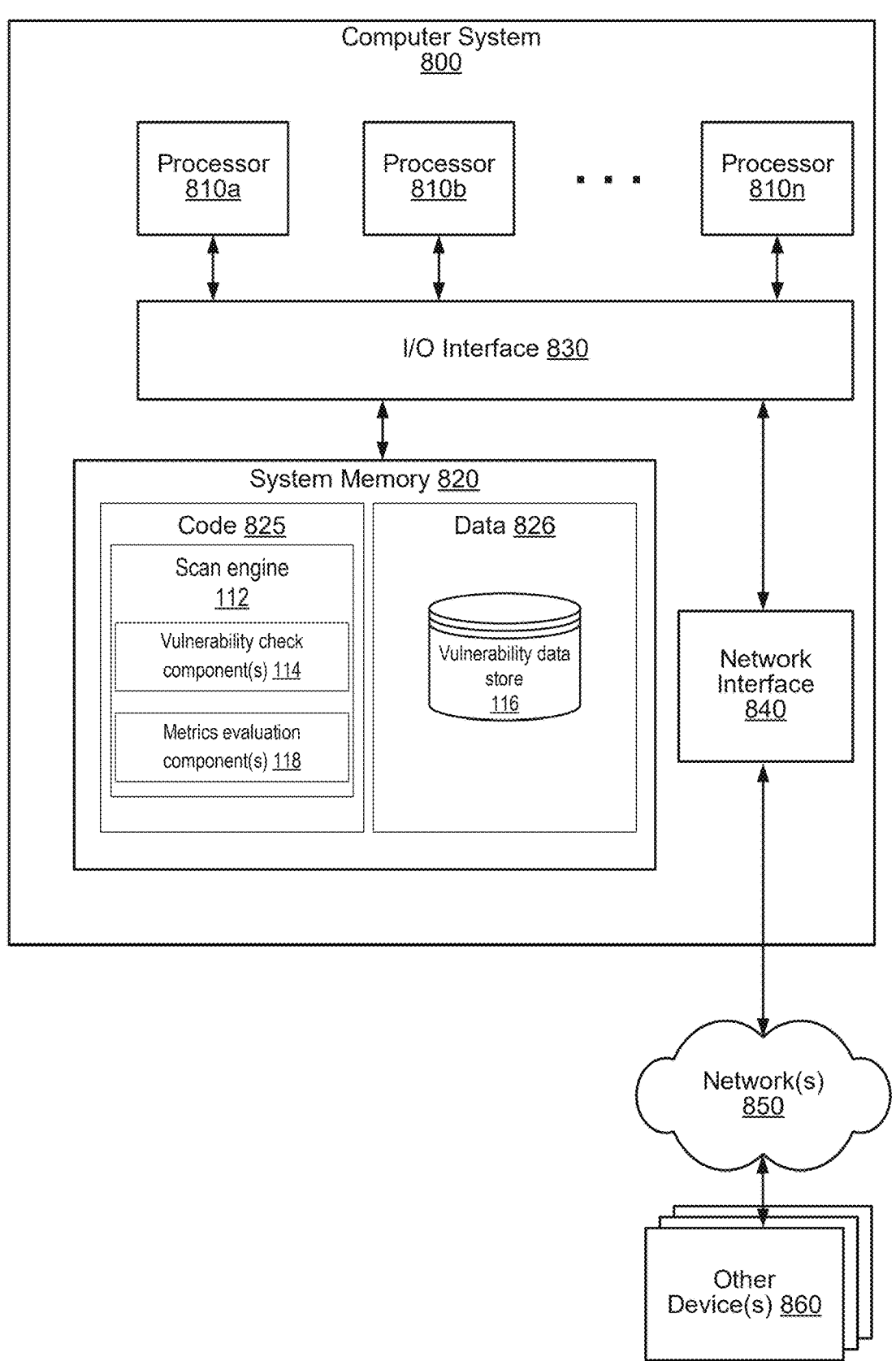
FIG. 8 is a block diagram illustrating an example computer system that may be used to implement one or more portions of a system that implements a complementary scan engine scheme for avoiding redundant vulnerability check data collection when using a scan engine to scan a target asset and/or that implements a vulnerability result integration scheme, according to some embodiments.

FIG. 8 is a block diagram illustrating an example computer system 800 that is used to implement one or more portions of a system that implements a complementary scan engine scheme for avoiding redundant vulnerability checks when using a scan engine to scan a target asset, according to some embodiments. For example, the computer system 800 may be a server that implements one or more components of the computing resource(s) 110 of FIG. 1.

Computer system 800 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 800 includes one or more processors 810, which may include multiple cores coupled to a system memory 820 via an input/output (I/O) interface 830. Computer system 800 further includes a network interface 840 coupled to I/O interface 830. In some embodiments, computer system 800 may be a uniprocessor system including one processor 810, or a multiprocessor system including several processors 810*a-n*, as shown. The processors 810 may be any suitable processors capable of executing instructions. For example, in various embodiments, processors 810 may implement one of a number of instruction set architectures (ISAs), such as the x86, PowerPC, SPARC, or MIPS ISA.

As shown, the computer system 800 may also include one or more network communication devices (e.g., network interface 840) for communicating with other systems and/or components over a communications network. For example, an instance of an application executing on computer system 800 may use network interface 840 to communicate with another server application executing on another computer system, as described herein.

As shown, computer system 800 may use its network interface 840 to communicate with one or more other devices 860, such as persistent storage devices and/or one or more I/O devices. In some embodiments, some of these other devices may be implemented locally on the computer system 800, accessible via the I/O interface 830. In various embodiments, persistent storage devices may include disk drives, tape drives, solid state memory, other mass storage devices, or any other persistent storage device. The computer system 800 may store instructions and/or data in persistent storage devices, and retrieve the stored instruction and/or data as needed.

As shown, the computer system 800 may include one or more system memories 820 that store instructions and data accessible by processor(s) 810. In various embodiments, system memories 820 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 820 may be used to store code 825 or executable instructions to implement the methods and techniques described herein. For example, the executable instructions may include instructions to implement the scan engine 112, including the vulnerability check component(s) 114 and the metrics evaluation component(s) 118, as discussed. The system memory 820 may also be used to store data 826 needed or produced by the executable instructions. For example, the in-memory data 826 may include portions of the vulnerability data store 116, as discussed.

In some embodiments, some of the code 825 or executable instructions may be persistently stored on the computer system 800 and may have been loaded from external storage media. The persistent storage of the computer system 800 and the external media are examples of non-transitory computer-readable storage media, which may be used to store program instructions to be executed by the computer system 800. A non-transitory computer-readable storage medium may provide the capability to store information in a form readable by a machine (e.g., computer system 800). Non-transitory computer-readable media may include storage media such as magnetic or optical media, disk or DVD/CD-ROM devices, archival tapes, network-attached storage systems, or other computer systems.

In some embodiments, the I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

In some embodiments, the network interface 840 may allow data to be exchanged between computer system 800 and other devices attached to a network. The network interface 840 may also allow communication between computer system 800 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems. Multiple input/output devices may be present in computer system 800 or may be distributed on various nodes of a distributed system that includes computer system 800. In some embodiments, similar input/output devices may be separate from computer system 800 and may interact with one or more nodes of a distributed system that includes computer system 800 through a wired or wireless connection, such as over network interface 840. Network interface 840 may commonly support one or more wireless networking protocols (e.g., Wi-Fi/IEEE 802.11, or another wireless networking standard). In some embodiments, the network interface 840 may support communication via telecommunications/telephony networks such as analog voice networks or digital fiber communications networks, via storage area networks such as Fibre Channel SANs, or via any other suitable type of network and/or protocol.

Various modifications and changes may be made as would be obvious to a person skilled in the art having the benefit of this disclosure. The various embodiments described herein are meant to be illustrative and not limiting. Many variations, modifications, additions, and improvements are possible. These and other variations, modifications, additions, and improvements may fall within the scope of embodiments as defined in the claims that follow.

What is claimed is:

1. A system, comprising:

one or more hardware processors with associated memory that store program instructions that when executed cause the one or more hardware processors to:

perform, using a scan engine external to a network, a vulnerability scan of a network node inside the network;

obtain, based on the vulnerability scan, scan results including a set of vulnerability results for the network node;

determine, from the scan results, a fingerprint that indicates a local scan agent is installed inside the network;

interrogate the local scan agent to capture metrics regarding scan history and scan performance of the local scan agent;

determine, according to a vulnerability result integration scheme, at least one integration state that defines whether to integrate a respective vulnerability result of the set of vulnerability results into one or more databases, wherein the at least one integration state is determined based at least in part on:

(a) whether a complementary scan scheme option is enabled, (b) whether the local scan agent is functioning inside the network and in a healthy status, determined based on an evaluation of the captured metrics regarding scan history and scan performance of the local scan agent, (c) whether a local scan agent check of the network node by the local scan agent is compatible for a vulnerability check corresponding to the respective vulnerability result; and in accordance with the at least one integration state:

integrate the respective vulnerability result into the one or more databases; or responsive to a determination that the respective vulnerability result is covered by the local scan agent, refrain from integrating the respective vulnerability result into the one or more databases.

2. The system of claim 1, wherein the at least one integration state defines whether an integrator is to integrate the respective vulnerability result into the one or more databases.

3. The system of claim 1, wherein the program instructions cause the one or more hardware processors to:

responsive to a determination that a correlation exists between the network node and a particular asset:

determine whether a local scan agent is installed on the particular asset; and responsive to a determination that the network node is not yet correlated with an asset:

create a new asset to correlate with the network node; and integrate the respective vulnerability result into the one or more databases.

4. The system of claim 1, whereinto determine whether the local scan agent is in the healthy status, the program instructions cause the one or more hardware processors to check whether the local scan agent is collecting and uploading data per a defined agent schedule.

5. The system of claim 1, wherein the program instructions cause the one or more hardware processors to:

store in a meta property in a vulnerability check file used to control scan operations of the scan engine, wherein the meta property indicates that the respective vulnerability result is attributable to local scan agent.

6. The system of claim 1, wherein the program instructions cause the one or more hardware processors to:

based on the determination that the respective vulnerability result is covered by the local scan agent, cause one or more overlapping vulnerability checks of the network node that are already performed by the local scan agent to be skipped in one or more subsequent scans of the network node performed by the scan engine.

7. The system of claim 6, wherein the program instructions cause the one or more hardware processors to:

perform a hybrid external/local scan of the network node, wherein some vulnerability checks of the hybrid external/local scan are performed locally by the local scan agent and other vulnerability checks of the hybrid external/local scan by the scan engine.

8. The system of claim 1, wherein:

the scan engine comprises a local scan engine that runs on a same computing device as a security console; and the program instructions cause the one or more hardware processors to:

present, via a user interface of the security console, at least one vulnerability result of the set of vulnerability results.

9. The system of claim 1, wherein:

the scan engine comprises a remote scan engine that runs on a first computing device;

the program instructions cause the one or more hardware processors to:

present, via a user interface of a security console, at least one vulnerability result of the set of vulnerability results, wherein the security console runs on a second computing device that interacts with the first computing device via a network communication protocol.

10. A method comprising:

performing, using a scan engine external to a network, a vulnerability scan of a network node inside the network;

obtaining, based on the vulnerability scan, scan results including a set of vulnerability results for the network node;

determining, from the scan results, a fingerprint that indicates a local scan agent is installed inside the network;

interrogating the local scan agent to capture metrics regarding scan history and scan performance of the local scan agent;

determining, according to a vulnerability result integration scheme, at least one integration state that defines whether to integrate a respective vulnerability result of the set of vulnerability results into one or more databases, wherein the at least one integration state is determined based at least in part on:

(a) whether a complementary scan scheme option is enabled, (b) whether the local scan agent is functioning inside the network and in a healthy status, determined based on an evaluation of the captured metrics regarding scan history and scan performance of the local scan agent, (c) whether a local scan agent check of the network node by the local scan agent is compatible for a vulnerability check corresponding to the respective vulnerability result; and in accordance with the at least one integration state:

integrating the respective vulnerability result into the one or more databases; or responsive to determining that the respective vulnerability result is covered by the local scan agent, refraining from integrating the respective vulnerability result into the one or more databases.

11. The method of claim 10, wherein the at least one integration state defines whether an integrator is to integrate the respective vulnerability result into the one or more databases.

12. The method of claim 10, further comprising:

responsive to determining that a correlation exists between the network node and a particular asset:

determining whether a local scan agent is installed on the particular asset; and responsive to determining that the network node is not yet correlated with an asset:

creating a new asset to correlate with the network node; and integrating the respective vulnerability result into the one or more databases.

13. The method of claim 10, wherein determining whether the local scan agent is in the healthy status comprises checking whether the local scan agent is collecting and uploading data per a defined agent schedule.

14. The method of claim 10, further comprising:

storing in a meta property in a vulnerability check file used to control scan operations of the scan engine, wherein the meta property indicates that the respective vulnerability result is attributable to local scan agent.

15. The method of claim 10, further comprising:

based on the determination that the respective vulnerability result is covered by the local scan agent, causing one or more overlapping vulnerability checks of the network node that are already performed by the local scan agent to be skipped in one or more subsequent scans of the network node performed by the scan engine.

16. One or more non-transitory computer-accessible storage media storing program instructions that, when executed on or across one or more hardware processors cause the one or more hardware processors to:

perform, using a scan engine external to a network, a vulnerability scan of a network node inside the network;

obtain, based on the vulnerability scan, scan results including a set of vulnerability results for the network node;

determine, from the scan results, a fingerprint that indicates a local scan agent is installed inside the network;

interrogate the local scan agent to capture metrics regarding scan history and scan performance of the local scan agent;

determine, according to a vulnerability result integration scheme, at least one integration state that defines whether to integrate a respective vulnerability result of the set of vulnerability results into one or more databases, wherein the at least one integration state is determined based at least in part on:

(a) whether a complementary scan scheme option is enabled, (b) whether the local scan agent is functioning inside the network and in a healthy status, determined based on an evaluation of the captured metrics regarding scan history and scan performance of the local scan agent, (c) whether a local scan agent check of the network node by the local scan agent is compatible for a vulnerability check corresponding to the respective vulnerability result; and in accordance with the at least one integration state:

integrate the respective vulnerability result into the one or more databases; or responsive to a determination that the respective vulnerability result is covered by the local scan agent, refrain from integrating the respective vulnerability result into the one or more databases.

17. The one or more non-transitory computer-accessible storage media of claim 16, wherein the at least one integration state defines whether an integrator is to integrate the respective vulnerability result into the one or more databases.

18. The one or more non-transitory computer-accessible storage media of claim 16, wherein the program instructions cause the one or more hardware processors to:

responsive to a determination that a correlation exists between the network node and a particular asset:

determine whether a local scan agent is installed on the particular asset; and responsive to a determination that the network node is not yet correlated with an asset:

create a new asset to correlate with the network node; and integrate the respective vulnerability result into the one or more databases.

19. The one or more non-transitory computer-accessible storage media of claim 16, wherein to determine whether the local scan agent is in the healthy status, the program instructions cause the one or more hardware processors to check whether the local scan agent is collecting and uploading data per a defined agent schedule.

20. The one or more non-transitory computer-accessible storage media of claim 18, wherein the program instructions when executed on or across the one or more hardware processors cause the one or more hardware processors to:

store in a meta property in a vulnerability check file used to control scan operations of the scan engine, wherein the meta property indicates that the respective vulnerability result is attributable to local scan agent.

* * * * *